Dec. 2, 1958 J. G. INGRES ET AL 2,862,366
BOOSTER BRAKE MECHANISM
Filed Nov. 3, 1952 2 Sheets-Sheet 1
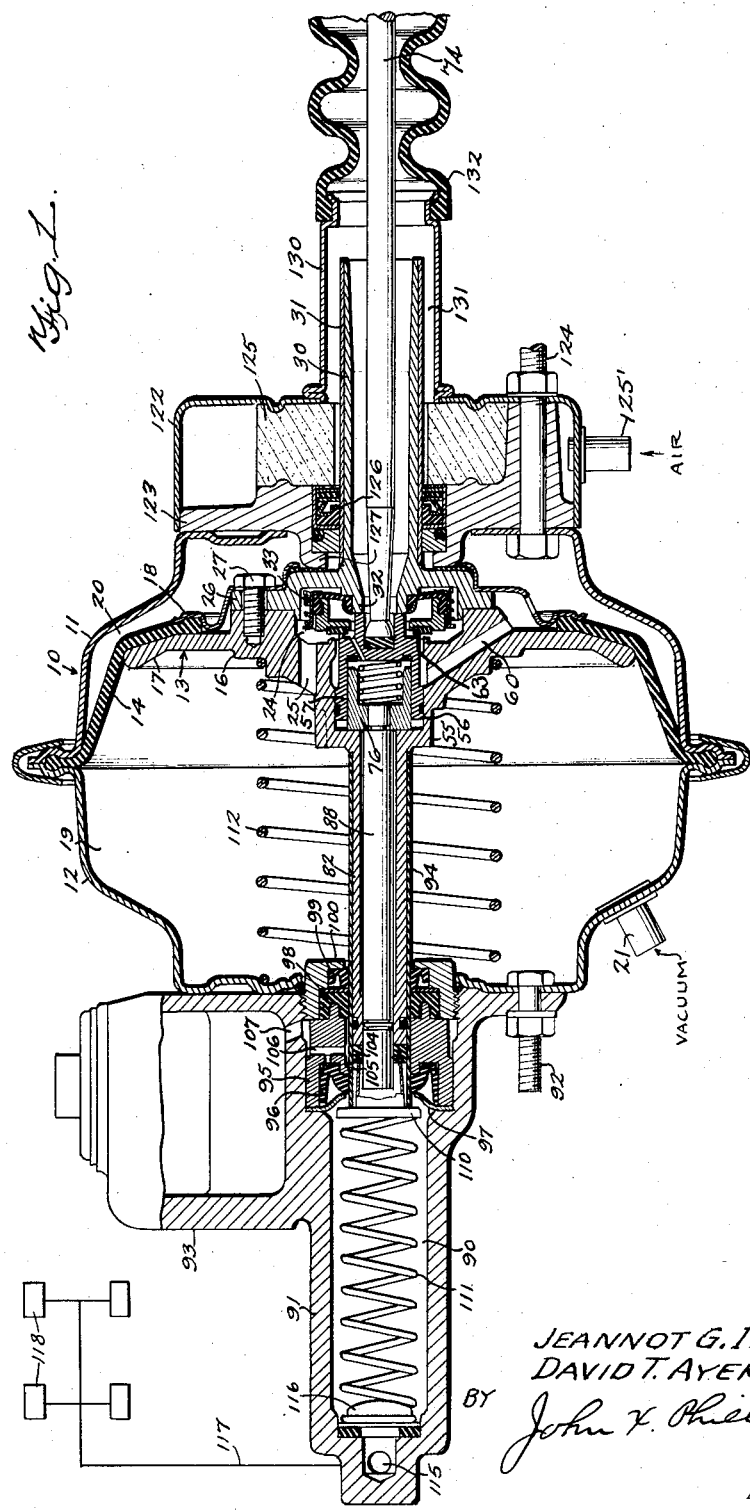
INVENTORS
JEANNOT G. INGRES
DAVID T. AYERS JR.
BY John F. Phillips
ATTORNEY

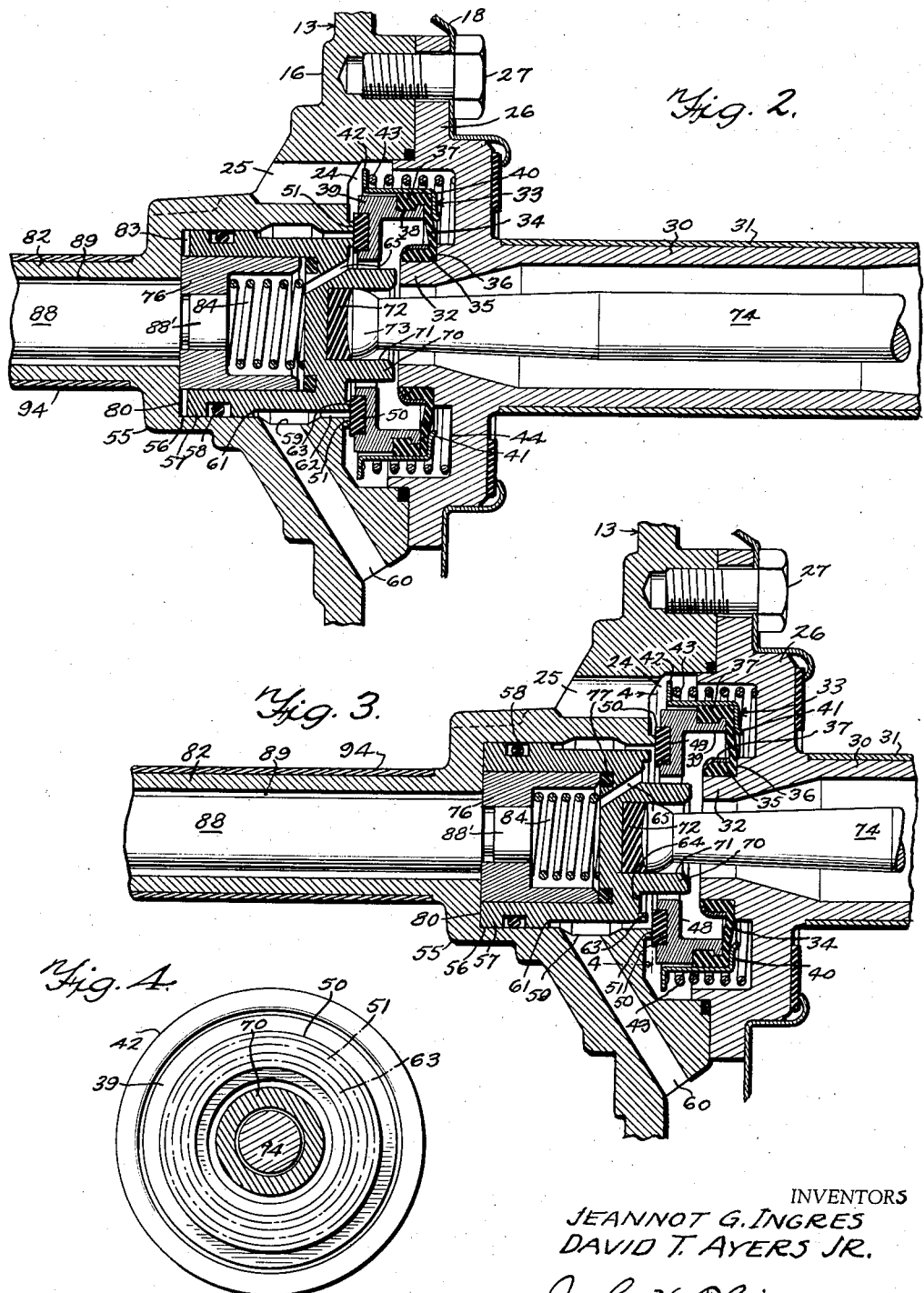

United States Patent Office 2,862,366
Patented Dec. 2, 1958.

2,862,366

BOOSTER BRAKE MECHANISM

Jeannot G. Ingres, Dearborn, and David T. Ayers, Jr., Birmingham, Mich., assignors to Kelsey-Hayes Company, a corporation of Delaware Application November 3, 1952, Serial No. 318,496

8 Claims. (Cl. 60—54.6)

This invention relates to booster brake mechanism, and has particular reference to the valve mechanism and associated elements for controlling the booster motor of such an apparatus.

It is now the more or less common practice to provide booster brake mechanisms to supply hydraulic fluid under pressure to the brake cylinders of motor vehicles. Such mechanisms more and more generally are combining the master cylinder with the booster mechanism, thus eliminating the use of conventional master cylinders. Many of the most efficient types of booster brake mechanisms employ differential fluid pressure motors, and the vacuum of the intake manifold is commonly employed as the source of pressure differential for operating such motors.

Devices of this type have now reached a relatively high degree of perfection, but they still leave something to be desired from the standpoint of operational characteristics. For example, many of these devices employ fluid displacing means movable into a fluid chamber, and such displacing means comprises a manually operable rod surrounded by a sleeve operated by the booster motor to be moved thereby with the manually operable rod substantially as a unit to displace fluid from the pressure chamber. A manually operable member connected to the brake pedal is employed, not only for moving the rod of the fluid displacing means but also for operating the valve mechanism of the booster motor to energize such motor to operate the fluid displacing sleeve in an accurate follow-up relation to the fluid displacing rod. It is highly desirable, particularly at the beginning of the pedal operation, to eliminate false resistances to movement of the brake pedal, the valve mechanisms commonly employed causing some such false resistances to movement.

In mechanisms of this character it has been the general practice to provide fixed connection between the pedal-operated rod and the fluid displacing rod and to provide lost motion between these elements and the pressure responsive unit of the booster motor. This lost motion is employed for effecting movement of the valve parts to energize the motor, and during the taking up of such lost motion, the fluid displacing rod moves ahead of the fluid displacing sleeve and encounters some resistance which is transmitted to the foot of the operator through the brake pedal. This resistance is due not only to line friction incident to the moving of hydraulic fluid from the pressure chamber, but also to resistance encountered in the opening of the conventional residual pressure valve arranged in the outlet of the high pressure chamber in booster brake mechanisms which do not employ a conventional master cylinder. This additional false resistance is undesirable particularly during that portion of the range of operation of the mechanism in which fluid is displaced to move the brake shoes into engagement with the brake drums prior to the building up of static pressure for applying braking pressures to the brake drums.

An important object of the present invention is to provide a novel cooperative relation between the brake pedal push rod and the other elements of the construction by providing lost motion not only between the brake pedal operated rod and the pressure responsive unit of the motor but also between such rod and the fluid displacing rod of the fluid displacing unit, thus providing for valve operating movement of the pedal-operated rod without applying fluid-displacing force to the fluid-displacing rod.

A further object is to provide such an apparatus wherein a light spring is interposed between the brake pedal operated rod and the fluid-displacing rod to hold the former in the normal "off" position so that upon initial movement of the brake pedal the only force required to move the pedal-operated rod is the negligible friction of the parts and the tension of the spring referred to, this tension being modified by the fact that it operates against the tension of a still lighter spring which tends to move the valve mechanism to a motor-energizing position.

A further object is to provide such an apparatus wherein the use of the light springs and the lost motion between the pedal-operated rod and the fluid-displacing rod relieves the brake pedal of false reaction forces which, with present constructions, tends to make initial brake operation sluggish.

A further object is to provide such an apparatus wherein, under operating conditions during actual brake operation in which the brake shoes are being applied to the brake drums under pressure, the play between the two rods referred to is taken up and the operator "feels" the acutal resistance of the fluid against the fluid-displacing rod, thus providing the brake pedal with the accurate "feel" desirable under such conditions.

Other objects and advantages of the invention will become apparent during the course of the following description.

In the drawings we have shown one embodiment of the invention. In this showing:

Fig. 1 is a longitudinal sectional view through a booster brake mechanism embodying the invention, parts being broken away and parts being shown in elevation, and the brake cylinders being diagrammatically represented;

Fig. 2 is an enlarged fragmentary sectional view through a valve mechanism for the booster, showing the valve parts in lap position;

Fig. 3 is a similar view showing the valve mechanism in the extreme booster motor energizing position; and Fig. 4 is a detail sectional view on line 4—4 of Fig. 3, omitting the fluid responsive unit surrounding the valve mechanism.

A complete operative booster brake mechanism is illustrated in Fig. 1, except for the mechanical connection of the manually operable member to the brake pedal of the motor vehicle. This connection is conventional, as will become apparent. Referring to Fig. 1, the numeral 10 designates a booster motor as a whole, comprising casing sections 11 and 12 in which is arranged a differential pressure responsive unit indicated as a whole by the numeral 13. This unit comprises a radially outer annular diaphragm 14 having its peripheral portion clamped between the casing sections 11 and 12 in a conventional manner.

The pressure movable unit 13 further comprises a preferably cast body 16 having an annular flange portion 17 engaging the diaphragm 14 as shown, the diaphragm being maintained in position by an annular clamping plate 18. The pressure responsive unit divides the motor into a pair of chambers 19 and 20, the former of which is.

connected by a suitable fitting 21 and conventional piping to the intake manifold of the motor vehicle engine where vacuum is used as the source of pressure differential. Under such conditions the chamber 19 may be considered as a constant pressure chamber and the chamber 20 as a variable pressure chamber, the pressure in the latter chamber being controlled by a novel valve mechanism which forms no part per se of the present invention, but is disclosed and claimed in the copending application of David T. Ayers, Jr., filed November 3, 1952, Serial No. 318,497, now Patent No. 2,763,989.

The body 16 of the pressure movable unit 13 is provided with an annular chamber 24 in fixed communication through a passage 25 with the motor chamber 19. A preferably cast cover plate 26 is fixed as at 27 to the body 16 at the side thereof opposite the passage 25, and the securing means 27 maintains the clamping plate 18 in position, as will be obvious. The cover plate 26 is provided with a preferably integral sleeve 30 (Figs. 1, 2, and 3) projecting toward the right as shown in Fig. 1, and this sleeve is preferably surrounded by a thin bearing sleeve 31, preferably formed of stainless steel to provide a smooth working surface, as will be apparent.

As more clearly shown in Figs. 2 and 3, the cover plate 26 is provided with an annular flange 32 projecting into the chamber 24. This flange supports a valve mechanism indicated as a whole by the numeral 33. The valve mechanism comprises a flexible diaphragm 34 having an inner hub portion 35 surrounding the flange 32 and seating against a shoulder 36 at the right-hand end thereof, and the hub of the diaphragm 35 is maintained in position by a pressed-on sheet metal retaining ring 37.

The diaphragm 34 is provided at its radially outer extremity with a longitudinally extending flange 37 engaging a groove 38 formed in a valve body 39. The peripheral portion of the diaphragm 34 is maintained in position by a pressed-on sheet metal sleeve 40. The right-hand end of the sleeve 40, as viewed in Figs. 2 and 3, is provided with an internal flange 41 engaging the diaphragm 34 to prevent any displacement of the diaphragm portion 37 toward the right in Figs. 2 and 3 under the influence of atmospheric pressure within the valve body under conditions to be described. The opposite end of the retaining sleeve 40 is provided with an outstanding annular flange 42 forming a seat engageable by one end of a compression spring 43. It will be noted that the cover plate 26 has a recess portion 44 forming a part of the valve chamber 24, and the opposite end of the spring 43 seats against the end wall of this recess. The spring 43 thus urges the valve 33 toward the left as viewed in Figs. 2 and 3. Since this is the only work which the spring 43 is called upon to perform, such spring may be, and preferably is, relatively lightly tensioned.

The valve body 39 has a radially inwardly extending wall 48 provided with an annular groove 49 in which is arranged a resilient valve 50 having a flat face projecting beyond the wall 48 to the left thereof for operative engagement with valve seats to be referred to. One of these valve seats is indicated by the numeral 51. Such seat is annular, as indicated in broken lines in Fig. 4, and is formed integral with the body 16 of the pressure movable unit. This valve seat projects slightly beyond the adjacent face of the chamber 24 and is arranged radially inwardly of the passage 25.

The body 16 of the pressure movable unit further comprises a hub portion 55 forming a cylinder 56 in which is slidably arranged a sleeve 57 sealed against leakage at its left-hand end, as viewed in Figs. 2 and 3, preferably by means of an O-ring 58. To the right of this O-ring the cylinder 56 is provided with an annular groove 59 communicating with a passage 60 leading into the variable pressure chamber 20 of the motor. To the left of the groove 59, the sleeve 57 is shouldered as at 61 to form a pressure surface for a purpose to be described. From this shoulder to the right-hand end thereof, the sleeve 57 is of reduced external diameter, forming an annular space 62 between this sleeve and the wall of the cylinder 56, and the sleeve 57 at the right-hand end terminates in an annular valve seat 63 engageable with the valve 50. The valve seat 63 extends to the right beyond the adjacent right-hand end portion of the sleeve 57 to provide an annular space 64, and this space communicates with the interior of the sleeve 57 through a passage 65, for a purpose to be described.

Radially inwardly of the valve seat 63, the sleeve 57 is provided with an axial extension 70 forming an axial recess 71 in the bottom of which is arranged a resilient disk 72. This disk is engageable by a head 73 formed on the end of a rod 74, the other end of which has mechanical connection in any suitable manner with the brake pedal of the motor vehicle. It will be apparent that depression of the brake pedal moves the manually operable rod 74 to the left in Figs. 1, 2, and 3 to perform the functions referred to in detail below.

Within the sleeve 57 is arranged a cup-shaped sleeve 76, the right end of which is open to the interior of the sleeve 57. The sleeve 57 may be provided with a resilient cushion 77 engageable, under conditions referred to, by the right end of the cup 76.

The hub 55 is provided at the left end of the cylinder 56 with a shoulder surface 80 against which the sleeve 76 is in constant, but not leakproof, engagement. The outer surface of the cup sleeve 76 is in slidable, but not sealing, engagement with the inner surface of the sleeve 57. It will become apparent below that atmospheric pressure is always present within the cup sleeve 76 through the passage 65, and air seeps between the sleeves 57 and 76, around the left end of the cup sleeve 76 and thence into the interior of an elongated axial sleeve 82, preferably formed integral with the body 16. In this connection, it will be noted that when the parts are in the "off" position shown in Fig. 1, movement of the sleeve 57 toward the right is limited by engagement of the flange 70 with the flange 32, but these flanges are not in sealing engagement with each other and the maintenance of atmospheric pressure in the interior of the sleeve 82, accordingly, is not affected.

The sleeve 57 has its left end spaced from the shoulder surface 80 in all positions of the parts, except under the extreme brake operating conditions shown in Fig. 3, in which case the sleeve 57 is moved the extreme distance to the left, at which time the right extremity of the cup sleeve 76 engages the cushion 77. Therefore it may be considered that there is normally an operating space 83 to the left of the sleeve 77, whereas the sleeve 76 is always in engagement with the shoulder surface 80. Thus, movement of the manually operable rod 74, except as referred to below, moves the sleeve 57 but does not transmit any positive force to the sleeve 76 or to the body 16 of the pressure movable unit. To tend to maintain the normal relative positions of the parts, a spring 84 engages at opposite ends against the sleeves 57 and 76. This spring is relatively weak but is stronger than, and normally overcomes the tension of, the spring 43 to tend normally to hold the valve parts in the "off" positions shown in Fig. 1. The force exerted by the spring 84 to tend to move the rod 74 toward the right, therefore, may be considered generally to be its own tension minus the tension of the spring 43, and the net force need be sufficient only to maintain the manually operable parts, including the brake pedal, in normal positions.

A plunger rod 88 is arranged within the sleeve 82. The rod 88 is provided with a head 88' fitted within the sleeve 76. The plunger rod is of slightly smaller diameter than the interior of the sleeve 82 to provide a space 89 in which atmospheric pressure will always be present for the reasons stated above. The sleeve 82 and plunger 88 constitute a fluid displacing unit for moving hydraulic fluid from a chamber 90 formed in a body 91 fixed as at 92 to the casing section 12. The body 91 preferably includes a reservoir 93, the present construction, as will be apparent, being a complete operating entity in itself without the use of the usual hydraulic brake master cylinder. The sleeve 82 is preferably surrounded by a stainless steel sleeve 94, which provides a smooth operating surface of minimum friction for the operation of the sleeve 94 through a bearing 95 having a seal 96 of the double-lipped type arranged therein and held in position by a retainer 97. To the right of the bearing 95, seals 98 and 99 surround the sleeve 94 and are held in position by a retainer 100 threaded into the body 91.

The sleeve 94 extends substantially beyond the sleeve 82, and between these members is arranged a double-lipped seal 104 to the left of which the sleeve 94 is provided with a port 105 communicating with the reservoir 93 through a passage 106 in the bearing 95 and a port 107 formed in the bottom of the reservoir 93. The structure at the left end of the fluid-displacing unit forms no part of the present invention but is described and claimed in the copending application of David T. Ayers, Jr., Serial No. 318,495, filed November 3, 1952, now Patent No. 2,767,548.

A seat 110 engages the left end of the sleeve 94, and a spring 111 has one end engaging this seat to tend to maintain the parts normally in an "off" position. This spring is assisted by the usual return spring 112 arranged in the motor chamber 19 and engaging at opposite ends against the casing section 12 and the body 16 of the pressure movable unit 13.

At its left end, the chamber 90 is provided with an outlet opening 115 the flow of fluid through which is controlled in the usual manner by a residual pressure valve 116. The outlet 115 is connected to the brake lines 117 to supply hydraulic fluid to the wheel cylinders 118.

An suitable means may be provided for supporting the sleeves 30 and 31 for reciprocation. This means is preferably as shown in Fig. 1 and forms, per se, no part of the present invention. An air cleaner 122 has its body 123 fixed as at 124 to the casing section 11 and carries an air cleaning unit 125 through which air flows from the atmosphere through a suitable inlet 125'. Any suitable bearing and sealing means, indicated generally by the numeral 126, is carried by the air cleaner body 123 and slidably engages the sleeve 31. The air cleaner body 123 has a shoulder 127 acting as a stop means to limit movement of the pressure movable unit 13 to the right to the "off" position shown in Fig. 1.

A sleeve 130 is carried by and projects to the right from the air cleaner and is of larger diameter than the sleeve 31 to form therewith an annular space 131 with which the right-hand open end of the sleeve 30 communicates. The usual dust excluding boot 132 is connected at its left end to the sleeve 130.

Operation

The parts of the device normally occupy the "off" positions shown in Fig. 1, the valve seat 63 engaging the valve 50, but the valve seat 51 being spaced from the valve 50. Accordingly, the motor chamber 19, which is in constant communication with the source of vacuum, normally communicates with the motor chamber 20 through passage 25, chamber 24, annular space 62 and passage 60, and the motor thus is normally vacuum suspended. Assuming that the brakes are to be applied, the operator will depress the brake pedal, thus moving the rod 74 to the left as viewed in Figs. 1, 2, and 3. Inasmuch as the following references to movements of the parts to the right or left will be applicable to Figs. 1, 2, and 3 only, it is believed unnecessary to further refer to such movements with respect to any particular figure or figures. Movement of the rod 74 to the left imparts similar movement to the sleeve 57, and since there is play between this sleeve and the sleeve 76 and the body 16, the initial movement of the rod 74 encounters, aside from negligible friction, only the resistance of the spring 84 minus the resistance of the valve spring 43. Thus, very light initial pressure on the pedal is required, this pressure being not in excess of 5 pounds.

Relatively slight movement of the rod 74 to the left against the slight resistance referred to, in the manner stated, moves the inner valve seat 63 to the left and the valve 50 will follow this seat under the influence of the spring 43 until the lap position of the valves is reached, as in Fig. 2. Both valve seats 51 and 63 will then contact the valve 50 and the closing of the valve at the seat 51 cuts off communication between the motor chambers 19 and 20. At this time approximately only half the normal space 83 will have been taken up and the rod 74 is still free to move without positively transmitting movement to the fluid displacing rod 88.

Slight further movement of the rod 74 to the left disengages the seat 63 from the valve 50, but not to the extreme extent shown in Fig. 3. Movement of the valve 50 to the left will be arrested by the valve seat 51 and hence the valve seat 63 will move away from the valve 50. Air will then flow through the air cleaner 122 (Fig. 1), sleeve 130, thence through sleeve 30 through the interior of the valve 33, around the valve 63, through space 62 and then through passage 60 into the motor chamber 20. The pressure in chamber 20 thus will increase, and differential pressure will move the unit 13 to the left to carry with it the sleeve 82 to displace fluid from the chamber 90 past the residual pressure valve 116 and into the brake lines. The sleeve 82 tends to move away from the cup sleeve 76 to which somewhat increased pressure of the spring 84 will now be applied. Thus, the plunger rod 88 will tend to move to the left with the sleeve 82, but the greater effective area of the sleeves 82 and 94 will perform the greater part of the work in building up pressure in the chamber 90 to displace fluid therefrom, whereas movement of the plunger 88 upon initial movement of the plunger 74 would have placed upon the plunger 88 all of the burden of displacing from the chamber 90 the fluid necessary to move the brake shoes into engagement with the brake drums. Therefore, no fluid is displaced from the chamber 90 until the motor 10 actually starts to operate, instead of the usual operation wherein fluid is first displaced by the rod 88 followed by energization of the motor 10.

Depending upon the design of the system as a whole and the particular vehicle on which the present device is used, a later pressure in the chamber 90 will be reached in which the sleeve 57 tends to move further to the left while pressure in the chamber 90 increases resistance to movement of the rod 88. Prior to the taking up of all of the play in the space 83 (Fig. 2), the resistance to movement of the rod 88 will have moved the cup sleeve 76 to its limit toward the right to bring the end of this cup into engagement with the cushion 77. From this point on in the further application of the brakes, the spring 84 becomes ineffective and a direct connection is established between rods 74 and 88 and the operator "feels" through the brake pedal a resistance which is proportional to the pressure in the chamber 90.

In the operation of most brakes, the operation of the brake pedal to effect a substantial brake application can result in only a given energization of the motor 10. As motor energization progresses, the rate of motor energization progressively decreases with respect to the rate of movement of the rod 74, if this rod is moved rapidly, and accordingly during such operation the space 83 (Fig. 2) may be gradually completely taken up. Under some conditions, therefore, a full and rapid brake application results in a full opening of the air valve 63 and the taking up of all of the play between the manually operable and motor operable parts, in which case the sleeve 57 will move into solid contact with the shoulder surface 80. The parts will then assume the positions shown in Fig. 3, and the rods 74 and 88 will move as a unit with the pressure movable unit 13. This condition will exist under varying conditions in different vehicles according to individual designs and may occur, for example, at a pedal prssure of from 50 to 80 pounds. Wherever this point occurs, the parts will remain as shown in Fig. 3 through any further depression of the brake pedal, and if necessary, therefore, pressure on the foot pedal may assist the motor in displacing fluid from the chamber 90. Of course, in the event of a failure of power in the motor 10, operation of the pedal will take up all play between the parts as shown in Fig. 3, and the brakes will be wholly manually applied.

Upon the releasing of the brake pedal, the manually operable parts will move toward the right and the spring 84 will again exert its force to bring the valve parts to the lap position in Fig. 2 and then to the "off" position shown in Fig. 1, whereupon the air valve 63 will be closed and the vacuum valve 51 will be opened and the motor again will be vacuum suspended.

From the foregoing it will be apparent that the mechanism smooths out the initial operation of the brake pedal by relieving the pedal of any necessity for having to displace fluid from the chamber 90 ahead of energization of the motor 10. Thus, initial sluggishness and the presence in the brake pedal of an artificial "feel" are eliminated.

We claim:

1. A booster brake mechanism comprising a hydraulic fluid chamber having an outlet adapted for connection with the brakes of a vehicle, a fluid-displacing device comprising a fluid-displacing rod, a fluid-displacing sleeve surrounding said rod and movable therewith into said chamber to displace fluid therefrom, a manually operable device comprising a manually operable rod biased to a normal "off" position and provided in such position with lost motion connection with said fluid-displacing device, a compression spring interposed between said devices, a motor having a power movable unit of which said sleeve is a part, spring means urging said power movable unit to a normal "off" position, said fluid-displacing device and said power movable unit having coacting shouldered portions normally seating against each other in the direction of movement of said fluid-displacing rod toward said chamber whereby said power movable unit limits movement of said fluid-displacing rod in said direction, and a follow-up control mechanism for said motor having connection with said manually operable rod and operable between extreme positions for respectively de-energizing said motor and for fully energizing said motor wholly within the limits of said lost motion.

2. Apparatus constructed in accordance with claim 1 wherein said motor is differential fluid pressure operated and said power movable unit is a differential pressure responsive unit dividing said motor into a pair of pressure chambers, said control mechanism comprising a valve device normally held by said manually operable device in a position connecting said motor chambers to each other when said manually operable rod is in its normal "off" position, said valve device being biased away from its normal position and movable with said manually operable device upon actuation thereof to first assume a lap position disconnecting said motor chamber, and then to a motor-energized position connecting one of said motor chambers to a source of pressure, the lost motion connection between said devices being of such length that said valve device is movable fully to said motor energizing position wholly within the limits of said lost motion connection.

3. A booster brake mechanism comprising a hydraulic fluid chamber having an outlet adapted for connection with the brakes of a vehicle, a fluid-displacing rod and a surrounding fluid-displacing sleeve movable into said chamber to displace fluid therefrom, a manually operable rod in axial alignment with said fluid-displacing rod, coaxial slidably connected sleeves connected to the respective rods, said coaxial sleeves having lost motion connection with each other, a spring interposed between said coaxial sleeves to urge said manually operable rod to a normal "off" position, a differential fluid pressure operated motor having a pressure movable unit dividing said motor into a pair of chambers and being fixed to said fluid-displacing sleeve, and a follow-up valve mechanism for said motor comprising a valve device in said pressure movable unit and a pair of valve seats one carried by said pressure responsive unit and the other by one of said coaxial sleeves, said valve mechanism being engaged by said one coaxial sleeve and held thereby in a normal motor de-energizing position when said manually operable rod is in said normal "off" position and being biased for movement to a motor energizing position to move to such position in response to movements of said one coaxial sleeve, wholly within the limits of the lost motion connection between said coaxial sleeves.

4. Apparatus constructed in accordance with claim 3 provided with a lost motion connection between said one coaxial sleeve and said pressure movable unit whereby the lost motion between said coaxial sleeves will be taken up against the tension of the spring interposed therebetween upon movement of said manually operable rod from said "off" position and upon the building up of a predetermined pressure in said fluid chamber so that said rods move as a unit, and the lost motion between said one coaxial sleeve and said pressure movable unit will be taken up upon the application of further force to said manually operable rod.

5. A booster brake mechanism comprising a hydraulic fluid chamber having an outlet for connection with the brakes of the vehicle, a fluid displacing rod and a surrounding fluid displacing sleeve movable into said chamber, to displace fluid therefrom, a booster motor having a power-movable unit connected to said sleeve and having an axial recess larger than said rod and opening away from said chamber and forming a shoulder at its inner end facing away from said chamber, a first sleeve in said recess carried by said rod and opening away from said chamber, said sleeve seating against said shoulder, a second sleeve axially slidable with respect to said first sleeve and having a normal position providing endwise lost motion with respect thereto, a spring interposed between said sleeves to urge said second sleeve to said normal position, a manually operable element having mechanical connection with said second sleeve for moving it away from its normal position, said manually operable element and said second sleeve forming a manually operable unit, and a follow-up control mechanism for said motor connected to be responsive to relative movements of said power movable unit and said manually operable unit.

6. A booster brake mechanism comprising a hydraulic fluid chamber having an outlet for connection with the brakes of a vehicle, a pair of elements movable into said chamber to displace fluid therefrom, a motor connected to one of said movable elements and energizable to operate such element to displace fluid from said chamber, and a control mechanism connected to said motor and to a power source and manually movable from a normal off position to energize said motor, said control mechanism and the other of said movable elements being relatively movable toward each other when said control mechanism is moved to energize said motor, there being limited play between said control mechanism and said other movable element when said control mechanism is in its normal off position whereby said control mechanism is manually actuable to effect energization of said motor after which it engages said other movable element to be subject therethrough to pressure reaction forces in said chamber, said control mechanism comprising a force transmitting member having lost motion connection with said one movable element whereby, when pressure in said chamber increases to a predetermined point, said lost motion connection will be taken up and said force transmitting member will transmit manual forces to said one member.

7. A booster brake mechanism comprising a hydraulic fluid chamber having an outlet for connection with the brakes of a vehicle, fluid displacing means movable into said chamber, a motor mechanically connected to said fluid displacing means, a manually operable unit, a follow-up control mechanism, for controlling energization of said motor, engageable with and operable by said motor and by said manually operable unit, such unit having a normal off position in which said motor is deenergized and being movable in one direction from such position to operate said valve mechanism and energize said motor, said manually operable unit being movable from its off position independently of said motor and being engageable, in initial movement from its off position, with said follow-up control mechanism to energize said motor, a spring device forming the sole means opposing initial movement of said manually operable unit from said normal off position, and reaction means responsive to pressures in said fluid chamber for opposing movement of said manually operable unit in said one direction from said normal off position, said reaction means comprising a device abuttingly engageable with and movable relative to both said fluid displacing means and said manually operable unit.

8. A booster brake mechanism comprising a hydraulic fluid chamber having an outlet for connection with the brakes of a vehicle, fluid displacing means movable into said chamber, a fluid motor having a pressure movable unit therein connected with said fluid displacing means, a follow-up valve mechanism for controlling energization of said motor, a manually operable unit coaxial with said fluid displacing means, said manually operable unit being connected to said valve mechanism and normally occupying an off position in which pressures are balanced in said motor, said manually operable unit being movable from said off position to operate said valve mechanism to disconnect the ends of said motor from each other and connect one end of said motor to a source of pressure to operate said pressure movable unit, said manually operable unit having lost motion connection of predetermined length with said fluid displacing unit in the off position of said manually operable unit whereby the latter is movable from such position independently of said fluid displacing unit to effect energization of said motor, a reaction device having mechanical connection with said manually operable unit and with said fluid displacing means and responsive to pressures in said chamber to oppose movement of said manually operable unit to a degree proportional to pressures in said chamber, and means providing lost motion connection between said manually operable unit and said fluid displacing means when said manually operable unit is in normal position, which lost motion connection will be taken up when pressure increases to a predetermined point in said fluid chamber to establish direct mechanical connection between said manually operable unit and said fluid displacing means.

References Cited in the file of this patent

UNITED STATES PATENTS

| 1,921,590 | Staude | Aug. 8, 1933 |
| 1,960,996 | Guernsey | May 29, 1934 |
| 2,006,487 | Sorensen | July 2, 1935 |
| 2,050,702 | Jackson | Aug. 11, 1936 |
| 2,165,942 | Rossmann | July 11, 1939 |
| 2,331,238 | Schnell | Oct. 5, 1943 |
| 2,458,803 | Stelzer | Jan. 11, 1949 |
| 2,642,165 | Banker | June 16, 1953 |
| 2,685,171 | Price | Aug. 3, 1954 |

FOREIGN PATENTS

| 172,797 | Austria | Oct. 10, 1952 |